(12) United States Patent
Henson et al.

(10) Patent No.: US 9,790,434 B2
(45) Date of Patent: Oct. 17, 2017

(54) PORTABLE FUEL SYNTHESIZER

(71) Applicant: Portable GTL Systems, LLC, Dallas, TX (US)

(72) Inventors: Kevin Martin Henson, Garland, TX (US); Roy Alvin Bynum, Sachse, TX (US)

(73) Assignee: Portable GTL Systems, LLC, Dallas, TX (US)

( * ) Notice: Subject to any disclaimer, the term of this patent is extended or adjusted under 35 U.S.C. 154(b) by 190 days.

(21) Appl. No.: 14/485,495

(22) Filed: Sep. 12, 2014

(65) Prior Publication Data

US 2015/0344787 A1   Dec. 3, 2015

Related U.S. Application Data

(60) Provisional application No. 62/003,165, filed on May 27, 2014.

(51) Int. Cl.

| | |
|---|---|
| *B01J 8/00* | (2006.01) |
| *C10G 2/00* | (2006.01) |
| *C10L 1/08* | (2006.01) |
| *C01B 3/34* | (2006.01) |

(52) U.S. Cl.
CPC .................. *C10G 2/34* (2013.01); *C01B 3/34* (2013.01); *C10G 2/32* (2013.01); *C10G 2/341* (2013.01); *C10L 1/08* (2013.01); *B01J 2219/00022* (2013.01); *C01B 2203/0211* (2013.01); *C01B 2203/0255* (2013.01); *C01B 2203/062* (2013.01); *C01B 2203/1235* (2013.01); *C01B 2203/1241* (2013.01); *C01B 2203/1247* (2013.01); *C01B 2203/1258* (2013.01); *C01B 2203/82* (2013.01); *C10G 2300/1025* (2013.01); *C10G 2300/4068* (2013.01); *C10G 2400/02* (2013.01); *C10G 2400/04* (2013.01); *C10G 2400/08* (2013.01); *C10L 2200/0492* (2013.01); *C10L 2270/026* (2013.01); *C10L 2290/42* (2013.01); *C10L 2290/543* (2013.01); *C10L 2290/58* (2013.01)

(58) Field of Classification Search
None
See application file for complete search history.

(56) References Cited

U.S. PATENT DOCUMENTS

| | | | |
|---|---|---|---|
| 1,746,464 A | 2/1930 | Fischer Franz | |
| 3,913,380 A * | 10/1975 | Jones | F02D 35/027 73/35.02 |

(Continued)

*Primary Examiner* — Jennifer A Leung

(57) ABSTRACT

A portable fuel synthesizer, comprising a portable housing, an electrical power source utilizing the hydrocarbon gas as fuel and connected to the portable housing, a boiler utilizing the hydrocarbon gas as fuel and connected to the portable housing, a reactor connected to the boiler to react the hydrocarbon gas to the hydrocarbon liquid, the reactor connected to the portable housing, at least one temperature sensor connected to the reactor to sense at least one temperature of the reaction, at least one pressure sensor connected to the reactor to sense at least one pressure of the reaction and a control system controlling the at least one of at least one temperature of the reaction and the at least one pressure of the reaction, the control system connected to the portable housing.

6 Claims, 6 Drawing Sheets

(56) References Cited

U.S. PATENT DOCUMENTS

| | | | | |
|---|---|---|---|---|
| 3,953,298 | A * | 4/1976 | Hogan | C10G 7/00 196/133 |
| 4,134,732 | A * | 1/1979 | Jackson | B01D 3/143 114/26 |
| 4,476,249 | A * | 10/1984 | Avery | B44C 5/06 518/702 |
| 4,681,603 | A * | 7/1987 | Spangler | C01B 3/34 95/166 |
| 4,743,517 | A * | 5/1988 | Cohen | H01M 8/0612 429/425 |
| 5,316,743 | A * | 5/1994 | LeBlanc | C10M 175/0025 196/106 |
| 8,574,501 | B1 * | 11/2013 | Greer | B01J 19/0046 422/129 |
| 2003/0225169 | A1 * | 12/2003 | Yetman | C01B 3/34 518/726 |
| 2004/0122114 | A1 * | 6/2004 | Font Freide | B01J 8/22 518/703 |
| 2004/0134660 | A1 * | 7/2004 | Hall | B01J 19/0093 166/357 |
| 2005/0106086 | A1 * | 5/2005 | Tomlinson | B63B 35/44 422/187 |
| 2005/0209348 | A1 * | 9/2005 | Bowe | B01J 19/249 518/703 |
| 2005/0222278 | A1 * | 10/2005 | Agee | B63B 35/44 518/702 |
| 2009/0261587 | A1 * | 10/2009 | Lomax | H02J 3/42 290/7 |
| 2010/0175320 | A1 * | 7/2010 | Schuetzle | C10K 3/026 48/76 |
| 2011/0163462 | A1 * | 7/2011 | Lang | B01J 19/00 260/1 |
| 2013/0213256 | A1 * | 8/2013 | McAlister | B01J 12/007 105/62.1 |

* cited by examiner

PORTABLE FUEL SYNTHESIZER

CROSS-REFERENCE TO RELATED APPLICATIONS

This application claims the benefit of U.S. Provisional Patent Application No. 62/003,165, filed on May 27, 2014, the subject matter of which is hereby incorporated by reference in its entirety.

FIELD

The present disclosure relates to the field of hydrocarbon fuel production and specifically to the self-contained, portable production of commercial fuels such as gasoline, diesel and jet fuel from a feedstock such as natural gas.

BACKGROUND

The Fischer-Tropsch (FT) process converts short chain hydrocarbons such as natural gas into other longer chained hydrocarbons. Natural gas is known as methane, chemical formula $CH_4$. Diesel fuel is typically composed of chains containing between 8 and 21 carbons, with hydrogen atoms attached, an average diesel molecule is $C_{13}H_{28}$. The FT process utilizes temperature, pressure, time and a catalyst to link short chain hydrocarbon compounds into longer chains.

The process variables of temperature, pressure, and process time used in the process determines the product(s) produced. The FT process remains sensitive to these process variables, which is why a Supervisory Control and Data Acquisition (SCADA) controller and system may be used to monitor and adjust the process.

Fischer-Tropsch synthesis units tend to come in two scales. The first is desk top units designed to demonstrate the principal to chemical engineering students. Table top units cannot produce enough fuel to be significant. The second type of FT unit varies from taking up medium sized buildings to sprawling across many acres. These large commercial units are very expensive and are designed for installation in a particular location.

Because natural gas is an inherently energetic material, it is possible to utilize a small portion of the input natural gas feedstock to fuel a small electrical generator and fire a steam boiler, that provide the electrical and thermal energy for the process. It is envisioned that automation may reduce the need for a human operator to oversee the conversion of feedstock natural gas to commercial liquid fuels.

Additionally, facilities that utilize the Fischer-Tropsch process to convert short chain hydrocarbons to long chain hydrocarbons have other systems and process functions that are ancillary to the FT process itself. The synthesis reformer takes the short chain hydrocarbons and converts them to what is referred to a synthesis gas (syngas) made up of a mixture of CO and $H_2$. In addition to the primary long chain hydrocarbon, water is produced as a waste product of the FT process. Hydro racking, separator and distillation systems separate waste water from the primary long chain hydrocarbons.

The instant disclosure envisions an FT unit that is portable, self-powered and self-contained. The disclosed system utilizes SCADA instrumentation and control systems to sense temperature, pressure, and flow rate, and automatically issue command controls. The implementation of the SCADA instrumentation and control systems are specific to allowing the unit system of the instant disclosure allow dark site installations, in which there are no personnel on site for long periods of time.

In addition to the higher level of automation, the unit system of this instant patent also contains Remote Monitoring and Management (RMM) functions that operate through a reliable communications link to a Remote Operations Management Facility (ROMF). The RMM functionality of the unit system of this disclosure allows the ROMF to manage multiple deployed unit systems at widely dispersed sites. Unlike large facilities that have many personnel working at the facilities, the personnel supporting these unit systems can be shared across many system units, reducing one of the highest operational costs of synthetic hydrocarbon production facilities. In situations where there is a natural disaster, the risk to personnel at the unmanned sites is greatly diminished.

When regular maintenance is scheduled for a specific unit system, the unit system can be shut down remotely, so that the maintenance personnel are not put at the risk of having to manually shut down a unit system, or perform maintenance on a unit system in active operation, with volatile processes producing volatile liquid hydrocarbons.

The instant disclosure provides a fuel synthesizer that is portable, self-powered and self-contained. This type of configuration reduces financial risk by distributing commercial liquid fuel production, reduces physical risk to personnel and allows nearly instantaneous fuel production at any site where natural gas is present as a feedstock.

SUMMARY

In one embodiment, a system, comprising at least one of a portable housing, an electrical power source utilizing a hydrocarbon gas as fuel and connected to the portable housing, a boiler utilizing the hydrocarbon gas as fuel and connected to the portable housing, a reactor connected to the boiler to react the hydrocarbon gas to a hydrocarbon liquid, the reactor connected to the portable housing, at least one temperature sensor connected to the reactor to sense at least one temperature of the reaction, at least one pressure sensor connected to the reactor to sense at least one pressure of the reaction and a control system controlling the at least one of at least one temperature of the reaction and the at least one pressure of the reaction, the control system connected to the portable housing.

In another embodiment, a method, comprising at least one of generating electrical power utilizing a hydrocarbon gas as fuel, boiling water utilizing the hydrocarbon gas as fuel, reacting the hydrocarbon gas using the boiling water to react the hydrocarbon gas to a hydrocarbon liquid, sensing at least one temperature of the reaction, sensing at least one pressure of the reaction and controlling at least one of the at least one temperature of the reaction and the at least one pressure of the reaction.

In a further embodiment, a non-transitory computer readable storage medium to store instructions that when executed causes at least one processor to perform at least one of controlling a generation electrical power utilizing a hydrocarbon gas as fuel, controlling a boiling of water utilizing the hydrocarbon gas as fuel, sensing at least one temperature of a reaction to react the hydrocarbon gas to a hydrocarbon liquid, sensing at least one pressure of the reaction to react the hydrocarbon gas to the hydrocarbon liquid and controlling the reaction to react the hydrocarbon gas to the hydrocarbon liquid using the boiling water and based on at least one of the at least one temperature of the reaction and the at least one pressure of the reaction.

BRIEF DESCRIPTION OF THE DRAWINGS

Various aspects and advantageous features of the present disclosure will become more apparent to those of ordinary skill when described in the detailed description of an example and reference to the accompany drawing wherein.

DETAILED DESCRIPTION

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification does not necessarily refer to the same group of examples, and the described features, structures, or characteristics may be combined in a suitable manner in one or more examples.

Figure 1:
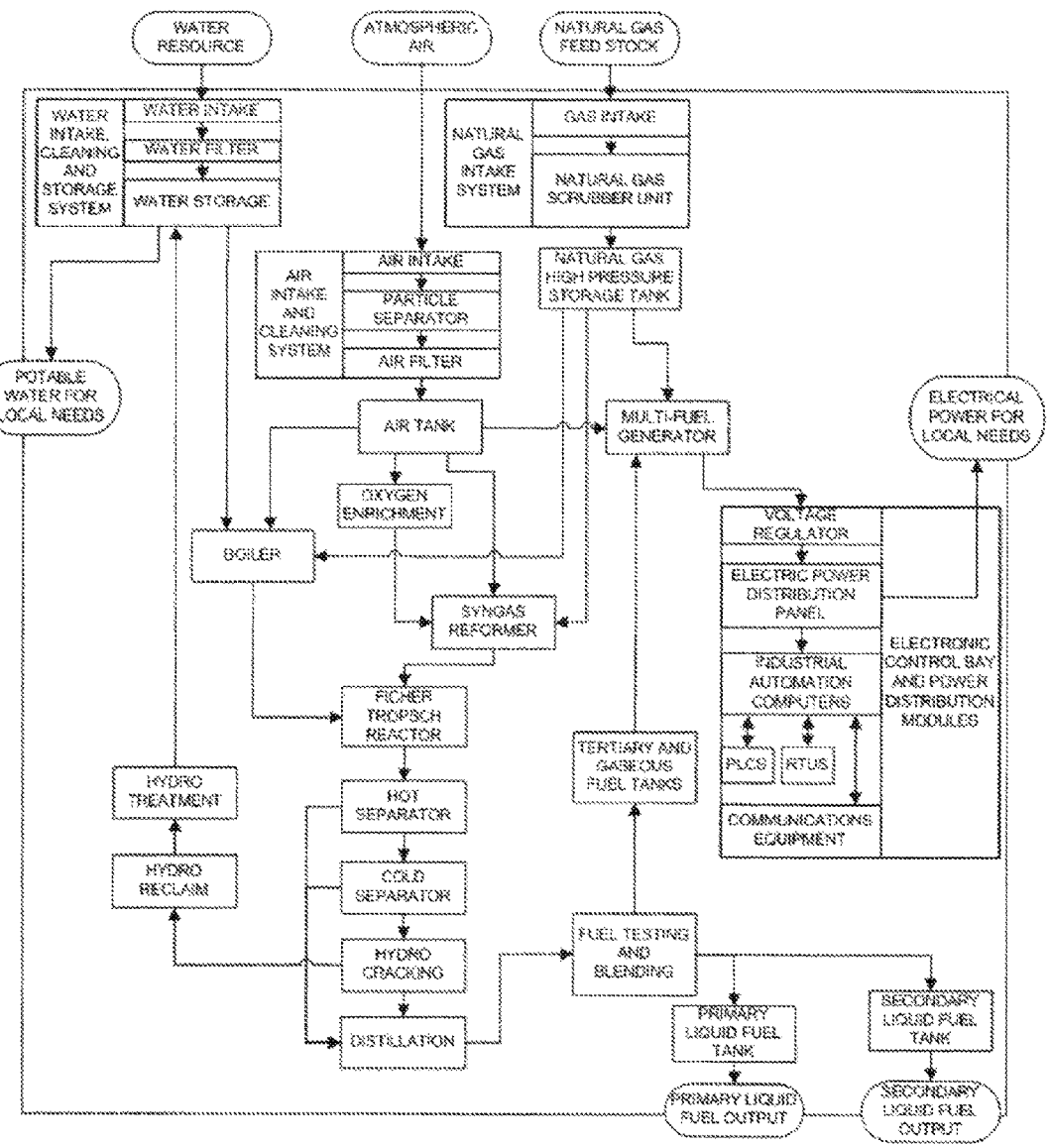
FIG. 1 illustrates a liquid fuel production process overview, in accordance with one embodiment of the disclosure.

An illustration of a liquid fuel production process overview FIG. 1 depicts the overall configuration and relationships of the processes specific to components contained within one embodiment of the instant unit system using current technology in the components and component assemblies, configured in a manner for the production of a blend of synthetic liquid hydrocarbons to be used as a diesel type fuel. Different embodiments of the instant unit system can have different technologies used any of the component assemblies which will change the component assemblies and the interconnectivity of the component assemblies. Different embodiments of the instant unit system can be for the purpose of producing different types and blends of liquid long chain hydrocarbons which will change the components and component assemblies and the interconnectivity of the component assemblies.

The raw inputs of natural gas, water and air are initially drawn from outside of the unit, and conditioned. Air is filtered to ensure that abrasive particles are not ingested into the generator or boiler modules. Similarly water is filtered to remove contaminants and thus prevent scale and maintenance issues in the boiler. Lastly, on the input side, the natural gas goes through a hydrocarbon gas scrubber to remove sulfur and other pollutants.

Figure 2:
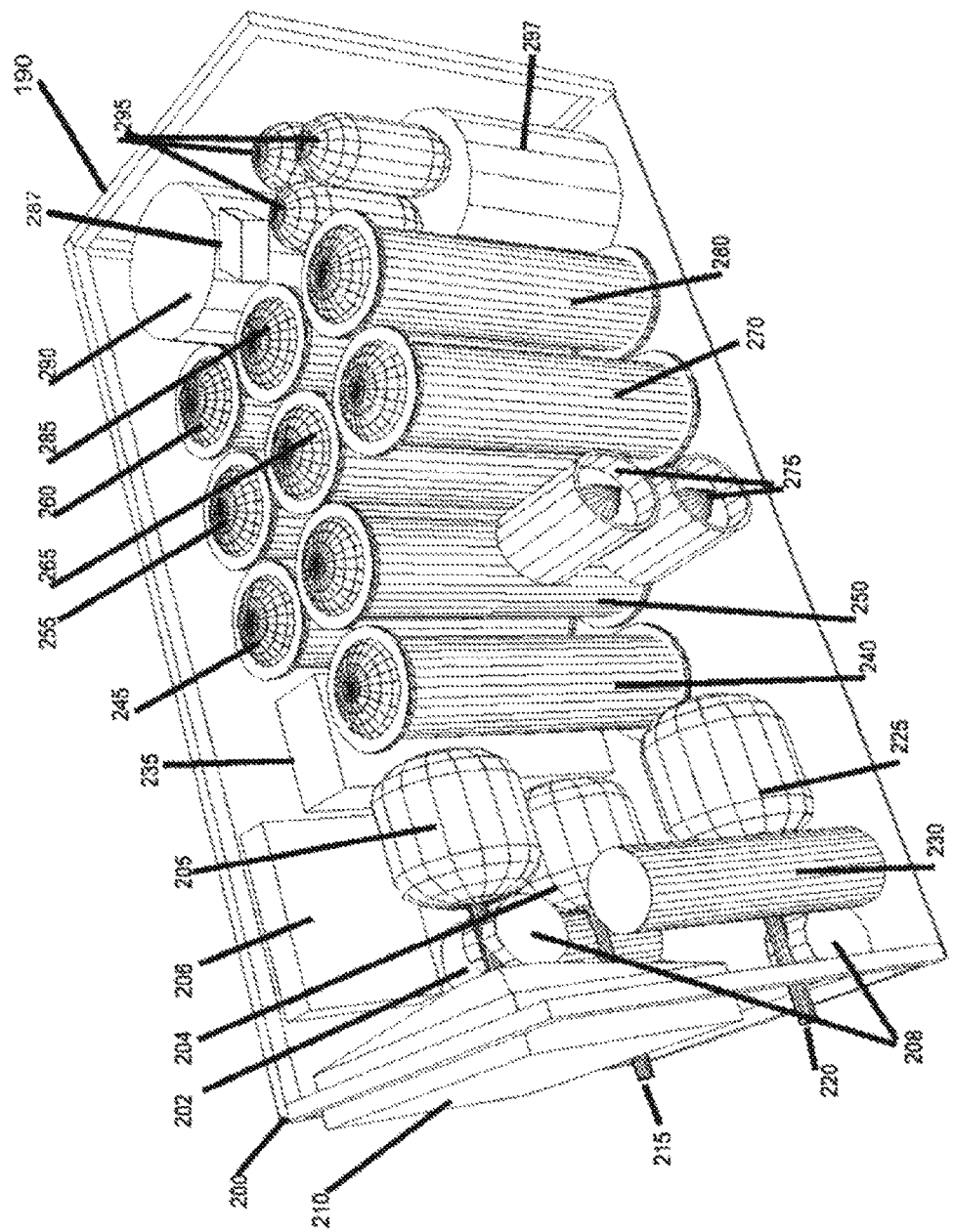
FIG. 2 illustrates an internal layout of a mobile liquid fuel production unit, in accordance with one embodiment of the disclosure.

FIG. 2 depicts an example layout of various components and assemblies can be located in the mobile unit system 190, according to one embodiment of the instant application. Other embodiments of this instant application can have any of the various assemblies located differently within the mobile unit system 190. Some components or assemblies may be replaced with new technology which changes the location and the interconnection of those components and assemblies. One or more components or assemblies may be removed because the type and grade of liquid hydrocarbons is different for one embodiment from one or more other embodiments.

A support frame 200, intermodal container is designed to be moved by forms of transport, the support frame provides the support and protection for system components and assemblies. The support frame may be configured in the dimensions and structure of an intermodal container to facilitate transport by semi-tractor, rail, or container ship. The support frame may be configuring in the dimension and structure of an open frame or it may be configured in the dimensions and structure of a semi-tractor trailer.

A water cleaning system 202 removes particles and contaminates by means of centrifugal particle separators and traditional filter technology. The water cleaning system receives water from the water connection (215) and the hydro reclaim (280) system. Once the unit is running, the process produces an excess of water that may be reclaimed and purified for other uses.

A water storage tank 204 provides internal storage of the supply of water from the water cleaning system or purified water from the water purification system. The water in the water storage tank can be used for the various processes specific to the SynGas conversion process such as the SynGas Reformer (250) and the Fischer-Tropsch reactor (245). Water in the water storage tank can also be made available for local needs.

An air tank 205 provides a pressure vessel for holding air with the contaminants removed and feed it into the various components at controlled rates. The air tank receives non-contaminated air from the air intake and cleaning system (210) and outputs the pressurized non-contaminated air primarily to the boiler (240) and the multi-fuel generator (275).

A local display and control panel 206 is used to display the functional conditions of the various components and processes in the system unit, and to provide a local method to manage the system unit, to start up or shut down the unit system. The local display and control panel connects to the automation computers in the power distribution module (235).

An input compressor 208 is used to provide pressurization to the input air and to the natural gas feed stock for the optimum operation of the system unit. The input compressors receive input air from the air intake and cleaning system (210) and the natural gas scrubbing unit (230) and output to the air tank (205) and the natural gas high pressure storage tank (225) respectfully.

An air intake and cleaning system 210 draws in ambient air and removes particles and contaminates by means of centrifugal particle separators and traditional filter technology. The cleaned air is input to one of the input compressors (208) where it is pressurized and sent to the air tank (205).

A water connection 215 receives water from local sources when there is not enough water in the water storage tank for proper function of the system unit. The water intake goes into the water cleaning system (202).

A natural gas intake 220 allows input of natural gas as feedstock. A considerable portion of the domestically produced natural gas is so called "sour gas". It contains impurities like hydrogen sulfide, hydrogen cyanide and other dangerous or noxious chemicals. The technology to remove and safely sequester these compounds is common within the natural gas pipeline industry. A commercially available "scrubber" will be used to remove these impurities. The "scrubbed" natural gas is sent to one of the input compressors (208) where it is pressurized and then sent to the natural gas high pressure storage tank (225).

A natural gas high pressure storage tank 225 provides a pressure vessel for holding natural gas that has had contaminants removed and feed it into the various components and controlled rates. The natural gas high pressure storage tank receives pressurized natural gas from a input compressor (208) and sends the pressurized natural gas to the SynGas reformer (250), the multi-fuel generator (275) and the boiler (240).

A natural gas scrubbing unit 230 is modular in nature and can have any internal arrangement suitable to for removing sulfurous compounds and other pollutants from the feed stock before synthesis. The natural gas scrubbing unit receives natural gas feed stock from the natural gas intake (220) and sends the "scrubbed" natural gas to one of the input compressors (208) where it is pressurized for storage in the natural gas high pressure storage tank (225).

An electronic control bay and power distribution module 235 houses the programmable logic controllers (PLCs), remote terminal units (RTUs), industrial automation computers, communications equipment, to support process automation and either remote or onsite process control and management. Broadly this is called the Supervisory Control and Data Acquisition system (SCADA) for this device. The SCADA system is used to connect the PLCs and RTUs to the various sensors and controller devices connected to the various components within the system unit. This bay also contains equipment to regulate voltage and provide power distribution to equipment with in the bay and other devices and components within the system unit, such as the input compressors (208). To facilitate this, it is anticipated that 110 and 220 VAC, 60 Hz power will be provided as well as 12 and 24 V DC. The power connections will be of types to facilitate compatibility with existing equipment. The VAC wiring will be contained and routed through rated explosion proof cabling and conduits.

A boiler 240 produces high temperature, high pressure steam for various stages in the synthesis process. The boiler receives water from the water storage tank (204) and outputs steam to the SynGas reformer (250) and possibly other functional units within the system unit. The heat energy is produced by burning natural gas received from the natural gas high pressure storage tank (225). Waste heat from the multi-fuel generator (275) may also be used as a heat energy source for the boiler.

A Fischer-Tropsch reactor 245 converts "SynGas" (CO+H2) into long chain hydrocarbons. The reactor in this system unit is modular in nature and can have any internal arrangement suitable for the Fischer-Tropsch process. The Fischer-Tropsch reactor receives SynGas from the SynGas reformer (250) and outputs long chain hydrocarbons to the hot separator (255).

A syngas reformer 250 converts gaseous hydrocarbons (methane, ethane, propane, butane mixtures) into "syn-gas" (CO+H2). The SynGas reformer receives natural gas from the natural gas high pressure storage tank (225) and outputs the SynGas to the Fischer-Tropsch reactor (245). Depending on the technology used within the SynGas reformer, it may also receive high pressure steam from the boiler (240).

A hot separator 255 separates liquid and gaseous downstream hydrocarbon products at high temperatures and pressures. The hot separator receives liquid and gaseous hydrocarbon products from the Fischer-Tropsch reactor (245), outputs liquid hydrocarbons to the distillation unit (285) and gaseous hydrocarbons to the cold separator (260).

A cold separator 260 separates liquid and gaseous downstream hydrocarbon products at low temperatures and high pressures. The cold separator receives gaseous hydrocarbons from the hot separator (255), outputs liquid hydrocarbons to the distillation unit (285) and gaseous hydrocarbons to the hydro cracker (265).

A hydro cracker 265 breaks down and separates hydrocarbon chains that are too long or "waxy" for inclusion in the final product. The hydro cracker receives gaseous hydrocarbons from the distillation unit (285), sends liquid hydrocarbons to the distillation unit (285) and the waste water, naphtha and gas-oil hydrocarbon slurry to the hydro treatment unit (270).

A hydro treatment module 270 removes nitrogen, oxygen and other impurities from the naphtha and gas-oil hydrocarbon slurry. The hydro treatment unit receives non-potable water from the hydro reclaim unit (280) and sends potable water to the water storage tank (204).

A multi-fuel generator 275 converts gaseous hydrocarbons into mechanical and electrical energy via internal combustion. The arrangement of an aero-derived multi-fuel gas turbine attached to an alternator through a gear-train to produce acceptable results. The waste thermal energy from the exhaust may be captured to preheat water supplied to the boiler.

A hydro reclaim unit 280 removes water from the product mixture so it can be reused, and the final fuel product will be contamination free. The hydro reclaim receives a water and liquid hydro carbon slurry from the hydro cracker (265) and outputs waste product non-potable water to the hydro treatment unit (270).

A distillation unit 285 performs fractional distillation and separation of hydrocarbon products for final blending and output. The distillation unit receives liquid hydrocarbons from the hot separator (255), the cold separator (260) and the hydro cracker (265) and sends the separated liquid hydrocarbon products to the fuel testing and blending unit (287).

A fuel testing and blending unit 287 tests the length of the hydrocarbon chains produced by the Fischer-Tropsch reactor (245) to verify that they are correct for the primary fuel blend to be produced by the system unit, and then blend those primary length hydrocarbons to the correct ration for the primary fuel blend. The fuel testing and blending unit receives the separated hydrocarbons from the distillation unit (285) and outputs the primary blended liquid fuel to the main fuel tank (290). Hydrocarbons that do not meet the specifications of the primary liquid fuel are sent to the tertiary tank array (295), and to the secondary fuel tank (297) for any hydrocarbons that may also be of interest as a liquid fuel.

A main fuel tank 290 contains the primary hydrocarbon product. The primary liquid fuel, primary hydrocarbon product, is stored here temporarily until pumped away for use. The main fuel tank receives the primary hydrocarbon product from the fuel testing and blending unit (287) and outputs through a fuel product output valve.

A tertiary tank array 295 contains the gaseous/liquid mixed hydrocarbon products that are not of primary interest. These may be taped for external usage or cycled back into the system for internal energy production. The tertiary and gaseous fuel tanks receive the liquid and gaseous hydrocarbons that do not meet the specifications of the primary fuel from the fuel testing and blending unit (287) and outputs them to the multi-fuel generator (275) or through output service valves.

A secondary fuel tank 297 contains the secondary hydrocarbon products of interest. The secondary fuel tank receives the secondary hydrocarbon products from the fuel testing and blending unit (287) and outputs through a secondary fuel output valve.

Figure 3:
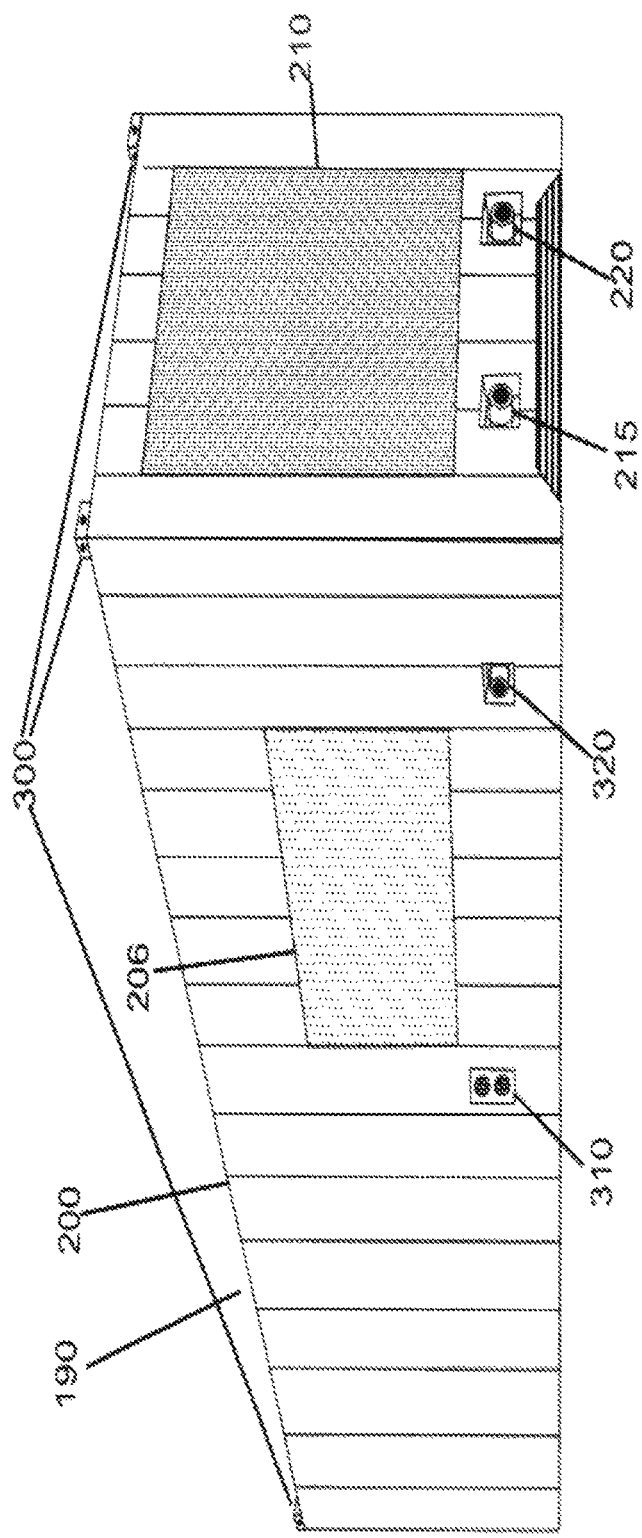
FIG. 3 illustrates a first external view of a mobile liquid fuel production unit in intermodal container format, in accordance with one embodiment of the disclosure.

FIG. 3 depicts an example external view of the mobile unit in an intermodal container 190. This view shows the support frame 200 configured as an Intermodal Container. The mobile unit system 190 is viewed from the end of the unit with the air intake 210 as shown in FIG. 2. The support frame 200 is designed to be moved by forms of transport. In this embodiment, the support frame is configured in the dimensions and structure of an intermodal container to facilitate transport by semi-tractor, rail, or container ship. The support frame may be configured in the dimension and structure of an open frame, or it may be configured in the dimensions and structure of a semi-tractor trailer.

Intermodal container lift points 300 facilitate the lifting and movement of the container to and from different transport systems such as rail cars, semi-tractor trailer chassis, or container ships. A local display and control panel is used to display the functional conditions of the various components and processes in the system unit, and to provide a local method to manage the system unit, to start up or shut down the unit system. A cleaning system 210 provides atmospheric oxygen may be harvested for the FT process. A water connection 215 receives water from local sources when there is not enough water in the water storage tank for proper function of the system unit. A natural gas intakes 220 natural gas feed stock that is to be converted to synthetic liquid hydrocarbons is feed into the mobile unit system through this natural gas intake. A local needs electrical power connection 310 provides electrical power at the panel. A potable water outlet 320 is for water that has been conditioned to provide potable water for local needs.

Figure 3A:
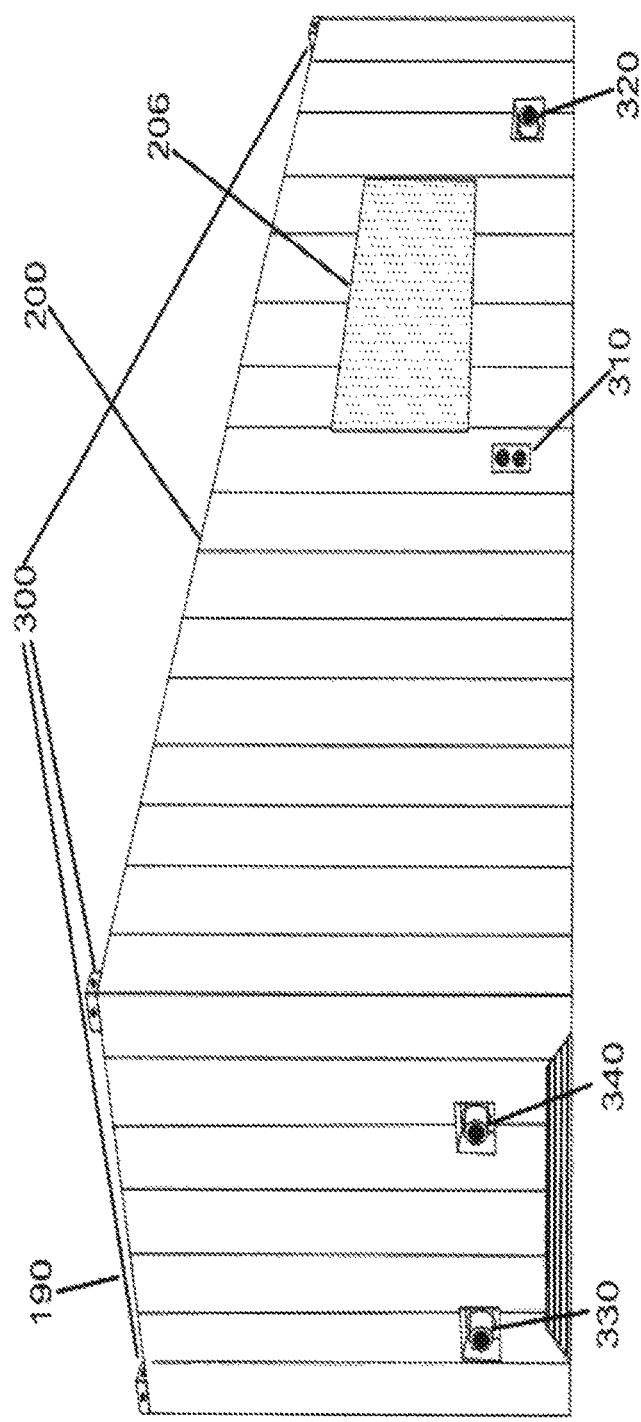
FIG. 3A illustrates a second external view of a mobile liquid fuel production unit in intermodal container format, in accordance with one embodiment of the disclosure.

FIG. 3A depicts an external view of the mobile unit in intermodal container format 190 from another external view. This view shows the support frame 200 built as an Intermodal Container. The mobile unit system 190 is viewed as the same Intermodal Container as FIG. 3, from the end of the unit with liquid hydrocarbon product outputs.

A support frame 200 is designed to be moved by forms of transport. In this embodiment, the support frame is configured in the dimensions and structure of an intermodal container to facilitate transport by semi-tractor, rail, or container ship. The support frame may be configured in the dimension and structure of an open frame or it may be configured in the dimension and structure of a semi-tractor trailer container as in FIG. 4.

Intermodal container lift points 300 facilitate the lifting and movement of the container to and from different transport systems such as rail cars, semi-tractor trailer chassis, or container ships. A local display and control panel 206 is used to display the functional conditions of the various components and processes in the system unit, and to provide a local method to manage the system unit, to start up or shut down the unit system. A local needs electrical power connection 310 provides electrical power at the panel. A potable water outlet 320 provides water that has been conditioned to provide potable water. A primary liquid hydrocarbon production output 330 outputs the primary liquid hydrocarbon product fuel containing the primary long chain hydrocarbon blend is output through this to external storage or liquid transport units or facilities. A secondary liquid hydrocarbon product output 340 provides liquid hydrocarbons that do not meet the primary long chain hydrocarbon blend specifications are output through this to external storage or liquid transport units or facilities.

Figure 4:
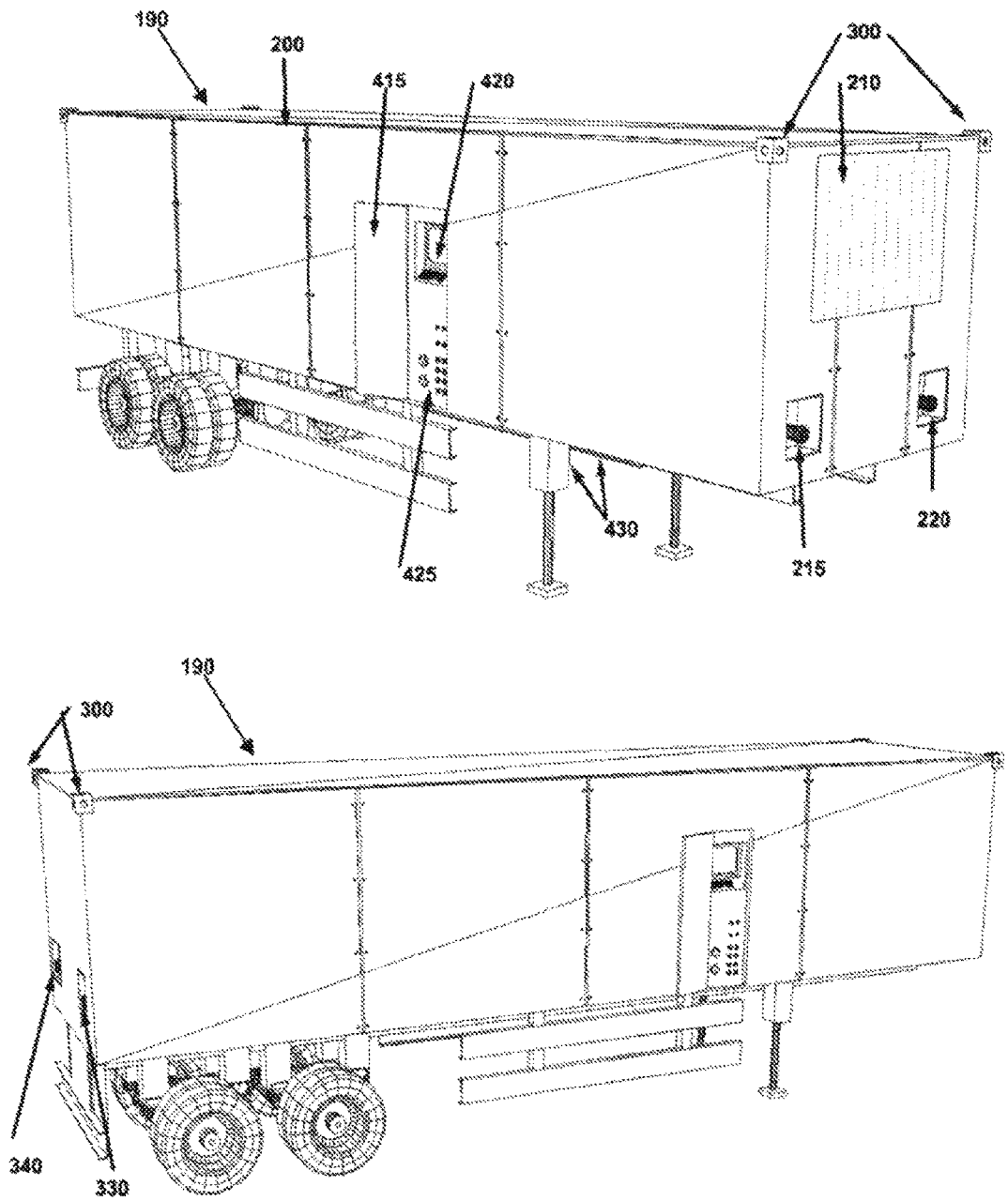
FIG. 4 illustrates an external view of a mobile liquid fuel production unit in a road transport chassis, in accordance with one embodiment of the disclosure.

FIG. 4 depicts an external view of the synthesis unit on a road transport chassis. By conforming to ISO semi-tractor trailer containers and international intermodal shipping containers, the unit may be transported by road, rail, sea or air using transportation practices and equipment. An external access panel is depicted as being open in this figure to reveal the SCADA and management console (420) and power plugs (425). Normally this would be closed for shipping. The power plugs (425) will provide power to external devices using common power standards and electrical receptacles. These could include 110 V and 220 V AC 60 Hz, and 12/24 V DC. The unit is self-contained and may be removed from the highway trailer chassis (430). Intermodal container lift points (300) are provided to facilitate transportation. The Cleaning system (210) is prominently visible at the end of the device as are the water and natural gas intake (220). The primary and secondary produce output ports are shown at the opposite end (330) (340).

A support frame 200 in this view is a semi-tractor trailer container on a road transport chassis. The container may be of several sizes to facilitate transport and set up in accordance with shipping practices such as ISO A and B sized 40 and 20 foot containers. Other sizes are possible to conform to specific customer and logistical needs. Intermodal container lift points 300 allow the container to be moved with existing equipment. A cleaning system 210 provides atmospheric oxygen may be harvested for the FT process. A water intake 415 receives water from local sources when there is not enough water in the water storage tank for proper function of the system unit. A management console 420 allows onsite personnel access to the controls systems to start, stop and maintains the unit. It also provides access to the diagnostic systems, and SCADA systems. This takes the form of an output screen capable of displaying a graphic user interfaces, ruggedized, input keyboard, computer pointing device (mouse, trackball, glide point, touch screen, etc.). Security functions are in place to prevent unauthorized changes to systems settings. This console also incorporates interface ports to service the computer systems and internal and external communication facilities to remotely manage this unit. The external electronics bay door provides access to a variety of electronic systems, controls and electrical power hookups.

Power plugs 425 allow external devices to be powered form the internal power network of the unit. Plug-ins are provided for alternating and direct current power of various standards. This panel also for access to the circuit breakers and other safety systems associated with power connections.

A highway trailer chassis 430 facilitates road transportation. A water connection 215 quick connect pipe provides for filling or draining the onboard water supply and purification system. A natural gas intake 220 quick connect high pressure fitting to connect the system to its feed stock. A primary liquid hydrocarbon output 330 allows for the transfer of liquid petroleum products to external holding facilities in accordance with petrochemical handling procedures. A secondary liquid hydrocarbon product outlet 340 allows for the transfer of different liquid petroleum products to external holding facilities in accordance with petrochemical handling procedures.

Figure 5:
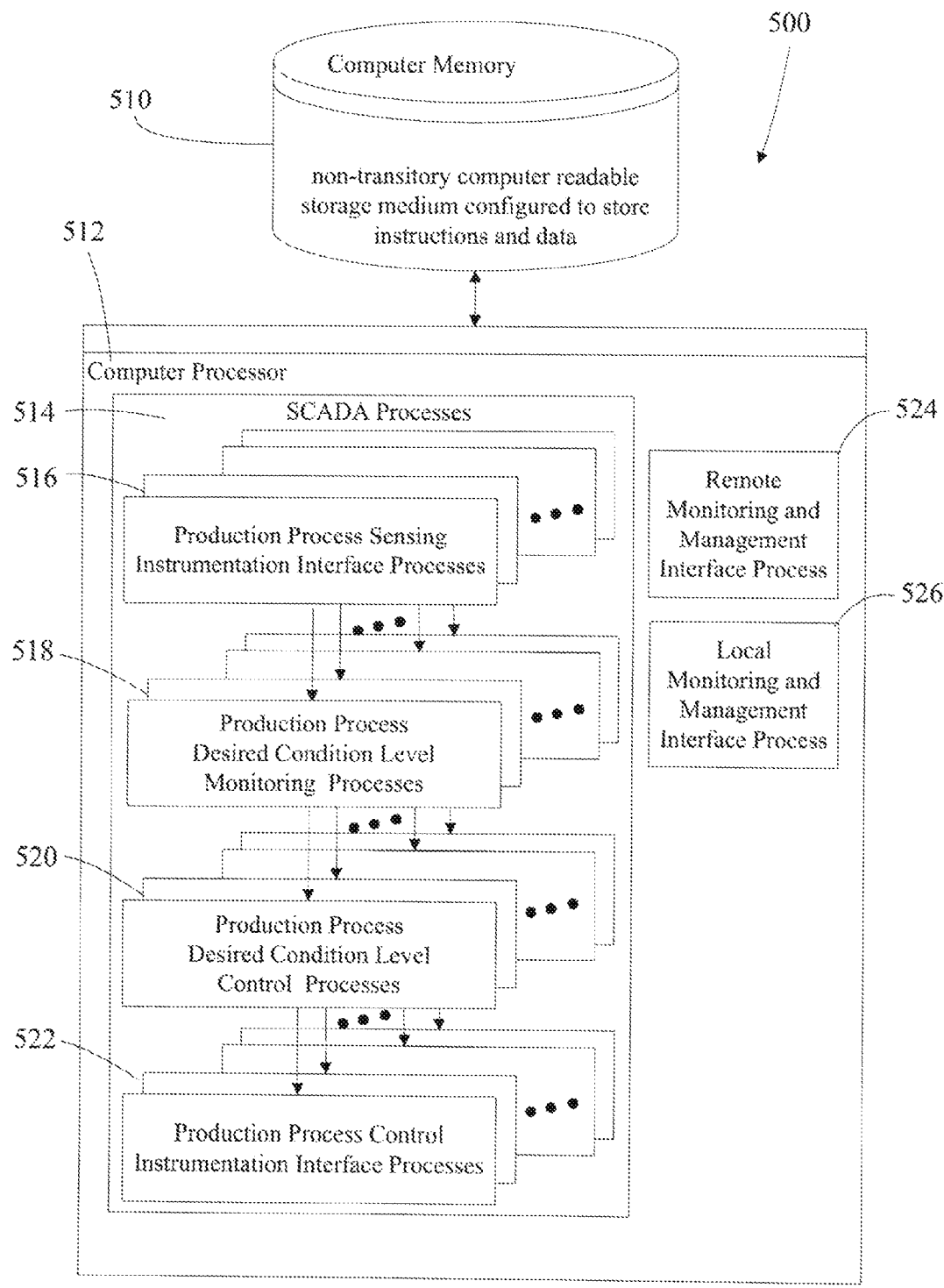
FIG. 5 illustrates a non-transitory computer readable storage medium of the communication and control of a mobile liquid fuel production unit, in accordance with one embodiment of the disclosure.

In FIG. 5 a non-transitory computer readable storage medium 510 configured to store instructions that when executed causes at least one processor 512 to perform multiple process primarily related to Surveillance Control and Data Acquisition (SCADA) processes 514, the Remote Monitoring and Management Interface Process 524, and the Local Monitor and Management Interface Process 526. The SCADA Processes may comprise multiple Production Process Sensing Instrumentation Interface Processes 516 and the like, which receive data from the unit process sensing instrumentation, such as temperature using a temperature sensor, pressure using a pressure sensor, and flow rate using a flow rate sensor, and the like and properly format the data before handing it off to the related multiple Production Process Desired Condition Monitoring Processes 518, which detect whether or not the multiple unit processes are operating within specified conditions communicate with the multiple related Production Process Desired Condition Control Processes 520, which format control change information data before handing it off to the multiple related Production Process Control Instrumentation Interface Processes 522, which interface with one or more of the multiple control instrument devices to make a change to one or more of the process to bring it in line with the process specified condition level of the specific process being controlled by the multiple control instrument devices. The non-transitory computer readable storage medium 510 also stores data regarding the continuous operations of the multiple processes and operating conditions within the system unit.

In another embodiment, a portable system for converting short chained gaseous hydrocarbons into long chained liquid hydrocarbons, the system has at least one of: one or more housing(s) or container(s), an integrated power source(s), an electronic control bay, automated measurement and control equipment, filter and processing equipment to extract impurities form the air, water and hydrocarbon feed stocks, a boiler to produce high pressure steam, a thermal reformer, a Fischer-Tropsch reactor, hot and cold separators, hydro cracking, waste water treatment, and final product blending, the system may also contain communications equipment for remote operation management and reporting.

The major components may be moved intact in international shipping containers. The system may be powered by either the feed stock hydrocarbons or hydrocarbons left over from the process that does not meet final product specifications. The process may be automatically regulated by a computer control system to ensure the correct product production. The computer control system may be located in the electronic control bay. The major assemblies for at least one of: the boiler, steam vessel, thermal reformer, Fischer-Tropsch reactor, separators and water treatment may be fully modular and field replaceable. The enclosure for at least one major assembly may be standardized and interchangeable, with piping pass-troughs running through the end caps of the cylinders. Sensors and automation control devices may be used to adjust the process. The sensors and automated control devices may be located throughout the unit system on the various components in the unit system. The sensors provide information about the processes within the various components to the computer control system which then makes adjustments to the processes using the automation control devices. Excess of electrical power may be produced by the integrated power source for on-site needs. Excess of potable water may be produced by the Fischer-Tropsch process in the Fischer-Tropsch reactor, and conditioned by the waste water treatment for on sight needs.

In a further embodiment of a system for converting short chained gaseous hydrocarbons into long chained liquid hydrocarbons, the system having at least one of: one or more assemblies modules and modular housing(s) or container(s), an integrated power source(s), filter and processing equipment to extract impurities form the air, water and short chain gaseous hydrocarbon feed stocks, a boiler to produce high pressure steam, a steam vessel, a methane to synthesis may be gas reformer (syngas reformer), a Fischer-Tropsch reactor, hot and cold separators, hydro cracking, waste water purification, final product blending, automated sensors, measurement and control equipment, automated process control computer, Integrated intra-system communications equipment, and communications equipment for remote operation management and reporting, contained in a housing of dimensions meeting intermodal shipping container specifications.

The major components and ancillary components may be moved intact in intermodal shipping containers. Waste product water may be purified and reused as water feed stock. The system may be powered by either the short chain gaseous hydrocarbon feed stock or long chain liquid hydrocarbons that may be produced by the conversion process which do not meet the specifications for the long chain liquid hydrocarbons produced by the conversion process. The major assembly modules for the boiler, steam vessel, syngas reformer, Fischer-Tropsch reactor, separators and water treatment may be fully modular and field replaceable. The enclosure for major assemblies may be standardized and interchangeable. Automated sensors, measurement and control equipment may be used to adjust the processes within the Portable System. The processes in the system may be regulated by the automated control computer utilizing the automated sensors, measurement and control equipment. Excess electrical power may be produced, by the integrated power source and conditioned for on-site needs. Waste product water may be produced by the Fischer-Tropsch process may be purified and conditioned for onsite needs.

Although an exemplary example of at least one of the system and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

The above examples are for illustrative purposes and are not intended to limit the scope of the disclosure or the adaptation of the features described herein to particular components. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced by examples in addition to those specifically described.

What is claimed is:

1. A system, comprising:
   a fully enclosed portable industry standard shipping container that can be transported as any other industry standard shipping container;
   an electrical power source utilizing a hydrocarbon gas as fuel and connected to and contained within said shipping container;
   a boiler utilizing said hydrocarbon gas as fuel within said shipping container;
   a reactor connected to said boiler to react said hydrocarbon gas to a hydrocarbon liquid, said reactor within said shipping container;
   a distillation unit within said shipping container and configured to perform fractional distillation and separation of hydrocarbon products;
   a syngas reformer within said shipping container connected to said reactor within said shipping container; and
   a fuel testing and blending unit within said shipping container and configured to receive separated hydrocarbons from said distillation unit and responsively output primary and secondary liquid hydrocarbon products of interest and at least one tertiary hydrocarbon product not meeting specifications for the primary hydrocarbon product.

2. The system of claim 1 further comprising a water cleaning system connected to said boiler and contained within said fully enclosed industry standard shipping container, the water cleaning system comprising centrifugal particle separators.

3. The system of claim 1 further comprising a hydrocarbon gas scrubber connected to said reactor and contained within said fully enclosed industry standard shipping container.

4. The system of claim 1 further comprising a power distribution module connected to said electrical power source and contained within said fully enclosed industry standard shipping container.

5. The system of claim 1 further comprising at least one flow rate sensor connected to said reactor to sense at least one flow rate of said hydrocarbon gas into said reaction.

6. The system of claim 1 further comprising at least one of a hot separator and a cold separator connected to said reactor and contained within said fully enclosed industry standard shipping container.

* * * * *